United States Patent
Tazaki et al.

(10) Patent No.: US 7,116,962 B2
(45) Date of Patent: Oct. 3, 2006

(54) TWO-WIRE POWER TRANSMITTING/RECEIVING DEVICE AND ITS METHOD

(75) Inventors: Hiroo Tazaki, Suita (JP); Yoshinari Mizuta, Otsu (JP); Mituo Miyagaki, Nishinomiya (JP)

(73) Assignee: Sekisuijushi Co., Ltd., Osaka (JP)

( * ) Notice: Subject to any disclaimer, the term of this patent is extended or adjusted under 35 U.S.C. 154(b) by 434 days.

(21) Appl. No.: 10/469,030

(22) PCT Filed: Feb. 26, 2002

(86) PCT No.: PCT/JP02/01694

§ 371 (c)(1),
(2), (4) Date: Aug. 26, 2003

(87) PCT Pub. No.: WO02/069518

PCT Pub. Date: Sep. 6, 2002

(65) Prior Publication Data

US 2004/0116101 A1 Jun. 17, 2004

(30) Foreign Application Priority Data

Feb. 27, 2001 (JP) .............................. 2001-052442

(51) Int. Cl.
*H04B 1/20* (2006.01)
(52) U.S. Cl. .................... 455/297; 340/310.11
(58) Field of Classification Search ............. 455/554.2, 455/550.1, 297; 340/505, 538, 518, 310, 340/310.11
See application file for complete search history.

(56) References Cited

U.S. PATENT DOCUMENTS 4,535,401 A 8/1985 Penn
4,926,158 A * 5/1990 Zeigler ....................... 370/294

FOREIGN PATENT DOCUMENTS

| JP | 52-121748 | 10/1977 |
|---|---|---|
| JP | 54-40304 | 12/1979 |
| JP | 3-117244 | 5/1991 |
| JP | 3-265328 | 11/1991 |
| JP | 06-252929 | 9/1994 |
| JP | 6-252929 | 9/1994 |
| JP | 8-51455 | 2/1996 |
| JP | 8-251680 | 9/1996 |
| JP | 9-130412 | 5/1997 |
| WO | 01/50626 | 7/2001 |

* cited by examiner

*Primary Examiner*—Nguyen T. Vo
*Assistant Examiner*—Tu X. Nguyen
(74) *Attorney, Agent, or Firm*—Wenderoth, Lind & Ponack, L.L.P.

(57) ABSTRACT

When power is supplied from a power transmitting side device 1, a FET 103 is turned ON and +12V direct current of a power source 101 is supplied to respective power receiving side devices. When transmission data is transmitted from the power transmitting side device 1, +5V direct current of a power source 201-1 is supplied to a terminal a, and a transistor 104 is turned ON/OFF due to a pulse-like voltage change of the transmission data, whereby the transmission data becomes a pulse-like 0V⇔+5V output waveform, and is output to the respective power receiving side devices. When the power transmitting side device 1 receives reply data from the power receiving side device, the power receiving side device changes a voltage to a 3.5V⇔+5V pulse as reply data. A photocoupler 105 detects the voltage change, whereby the power transmitting side device 1 receives the reply data from the power receiving side device.

13 Claims, 10 Drawing Sheets

TWO-WIRE POWER TRANSMITTING/RECEIVING DEVICE AND ITS METHOD

TECHNICAL FIELD

The present invention relates to power transmitting/receiving communication methods and apparatus, and more particularly, relates to a two-wire power transmitting/receiving communication method and apparatus for performing power transmission/reception and intercommunications using two power transmission wires.

BACKGROUND ART

Conventionally, as a two-wire power transmission method for performing power transmission/reception and intercommunications using two power transmission wires, there is a high-frequency superimposition method for superimposing a high-frequency signal onto the transmission wires for power transmission. In the high-frequency superimposition method, a power receiving side device includes a high-frequency bandpass filter, thereby detecting only a high-frequency signal. Also, a method for superimposing a phase-modulated pulse signal onto DC two transmission wires for power transmission, and a method for causing one of DC two-wires to be interrupted or shorted out at regular intervals, thereby performing pulse-like transformation for direct power for power transmission, are also known.

On the other hand, in Japanese Patent Examined Publication No. S54-40304, a method for performing time-shared power transmission of power and a signal is disclosed. This method is a method for transmitting the power and the signal over a pair of transmission wires by performing time-shared power transmission of the power and the signal from a power transmitting side. The power is ten smoothed by a condenser, etc., so as to be a direct current, a logic circuit and a relay drive circuit, etc., are activated, and the power and the signal are demultiplexed by detecting their differences in width and height, etc., in a power receiving side. Compared to the above-described high-frequency superimposition method, or the like, this method can realize power transmission/reception and communications at low cost with a simple circuit. Also, as a method for performing time-shared power transmission of the power and the signal, a method enabling bi-directional communications capable of specifying which power receiving side device processes the signal, by assigning an address to a signal to be transmitted, or capable of identifying a transmitting side which has transmitted the signal is also known.

However, the above-described high-frequency superimposition method has to use a complicated circuit structure and high-cost circuit parts for modulation in order to improve signal leakage and noise immunity, thereby increasing costs. Also, the above-described method for performing superimposition for a phase-modulated pulse signal for power transmission has a limit in a transmission speed, and the method for causing one of DC two-wires to be interrupted or shorted out at regular intervals has a problem that there is always noise, whereby both methods do not allow many power receiving side devices to be connected from the aspect of transmission efficiencies. Furthermore, as for the above-described method for performing time-shared power transmission for the power and the signal, a signal from the power transmitting side cannot be distinguished from a signal from the power receiving side based on a voltage, etc., and the power receiving side has to receive all signals from the power transmitting side and all signals from another power receiving side, and determine whether or not these are effective data addressed thereto, thereby complicating a process and increasing a burden in the power receiving side. As a result, a cost of software, etc., performing a process at the power receiving side is increased.

Therefore, an object of the present invention is to provide a low-cost and transmission-efficient two-wire power transmitting/receiving communication apparatus and method, which reduce a processing burden of the power receiving side.

SUMMARY OF THE INVENTION

To achieve the above objects, the present invention has the following aspects.

A first aspect of the present invention is directed to a power transmitting/receiving communication apparatus for performing power supply and intercommunications between a power transmitting side device and at least one power receiving side device, which are interconnected via two power transmission wires, wherein the power transmitting side device includes:
- a power transmitting side power source section for outputting power having a first power level;
- a power transmitting side data processing section for generating transmission data giving an instruction to the power receiving side device, and receiving and processing reply data from the power receiving side device;
- a power transmitting side period control section for performing time-sharing control for a period of supplying the power, a data transmission period of transmitting the transmission data, and a reply data reception period of receiving the reply data; and
- a power transmitting side synthesis section for supplying the power having the first power level, which is output from the power transmitting side power source section, to the power transmission wire during the power supply period, converting the transmission data into transmission data having a second power level for transmission to the power transmission wire during the data transmission period, and further transmitting, to the power transmission wire, a data reception signal having a power level different from the first power level during the reply data reception period, and the power receiving side device includes:
- a power receiving side power source section for storing the power having the first power level, which is supplied via the power transmission wire;
- a power receiving side data processing section for receiving and processing the transmission data having the second power level from the power transmitting side device, and generating the reply data making a reply to the power transmitting side device;
- a power receiving side transmitting section for converting the reply data output from the power receiving side data processing section into reply data having a third power level for replying to the power transmission wire, during the reply data reception period; and
- a power level detection section for detecting a power level of the power transmission wire, and outputting power level detection results to the power receiving side data processing section, and the power receiving side data processing section selects and receives data from the power transmission wire, based on the power level detection results from the power level detection section, and further outputs the reply data to the power receiving side transmitting section by detecting reception of the data reception signal.

Based on the above-described structure of the present invention, it is possible to perform time-shared transmission/reception of a power supply to the power receiving side device and communication data between the power transmitting side device and the power receiving side device. Further, it is possible for a power receiving side device to distinguish a type of data based only on level detection, by setting power levels of the transmission data from the power transmitting side device and the reply data from the power receiving side device at different levels, thereby selecting unnecessary data by a hardware-related process and reducing a processing burden of the CPU. As a result, a software process of the power receiving side device is simplified, and a cost of software can be reduced. Also, the power receiving side device can determine a timing of transmitting the reply data from the power transmitting side device, by detecting a voltage of the data reception signal, whereby it is possible to detect the timing and transmit the reply data when the power transmitting side device requests.

The above-described power receiving side data processing section is preferably characterized by selecting and receiving data having the second power level from the power transmission wire, based on the power level detection results from the power level detection section. Thus, the power receiving side device identifies the reply data from another power receiving side device by only voltage detection, and does not receive the data, thereby selecting unnecessary data by a hardware-related process and reducing a processing burden of the CPU. As a result, a software process of the power receiving side device is simplified, and a cost of software can be reduced.

The power transmitting side data processing section is preferably further characterized by attaching an address of the power receiving side device to the transmission data, as an address of a target to be instructed, and the power receiving side data processing section is characterized by processing only data having an address thereto, which is attached to the transmission data. Thus, the power transmitting side device can specify the power receiving side device processing the transmission data by attaching an address of the power receiving side device to the data to be transmitted, thereby reducing an process of the power receiving side device which does not require reception of the above-described data.

Also, the power receiving side data processing section is preferably characterized by further attaching an address thereof as a transmission source for making a reply. Thus, the power receiving side device replying by the reply data can be identified, whereby it is possible to identify the reply data of each power receiving side device and perform processing in a data process of the power transmitting side device.

The power transmitting side data processing section is preferably characterized by further attaching an identification code shared by all the power receiving side devices, which are connected to the power transmission wire, as an address of a target to be instructed, and all the power receiving side data processing sections connected to the power transmission wire are characterized by processing the transmission data in accordance with the identification code attached to the transmission data. Thus, the power transmitting side device can give an instruction, with a piece of transmission data, to all the power receiving side devices connected by the power transmission wire, thereby reducing a process of transmitting the transmission data.

A second aspect of the present invention is directed to a power receiving communication device, which is supplied with power from a power transmitting side device connected via two power transmission wires, for performing intercommunications with the power transmitting side device, comprising:

a power receiving side power source section for storing power having a first power level, which is supplied from the power transmitting side device via the power transmission wire;

a power receiving side data processing section for receiving and processing transmission data having a second power level from the power transmitting side device, and generating the reply data making a reply to the power transmitting side device;

a power receiving side transmitting section for converting the reply data output from the power receiving side data processing section into reply data having a third power level for replying to the power transmission wire, during a reply data reception period, in which the power transmitting side device performs time-sharing and transmits a data reception signal having a power level different from the first power level; and a power level detection section for detecting a power level of the power transmission wire and outputting power level detection results to the power receiving side data processing section, wherein the power receiving side data processing section selects and receives data from the power transmission wire, based on the power level detection results from the power level detection section, and further outputs the reply data to the power receiving side transmitting section by detecting reception of the data reception signal.

The power receiving side data processing section is preferably characterized by selecting and receiving data having the second power level from the power transmission wire based on the power level detection results from the power level detection section.

A third aspect of the present invention is directed to a power transmitting communication device for performing power supply and intercommunications with at least one power receiving side device connected via two power transmission wires, comprising:

a power transmitting side power source section for outputting power having a first power level to the power receiving side device;

a power transmitting side data processing section for generating transmission data giving an instruction to the power receiving side device, and receiving and processing reply data from the power receiving side device;

a power transmitting side period control section for performing time-sharing control for a period of supplying the power, a data transmission period of transmitting the transmission data, and a reply data reception period of receiving the reply data; and a power transmitting side synthesis section for supplying the power having the first power level, which is output from the power transmitting side power source section, to the power transmission wire during the power supply period, converting the transmission data into transmission data having a second power level for transmission to the power transmission wire during the data transmission period, and transmitting, to the power receiving side device, a data reception signal having a power level different from the first power level via the power transmission wire during the reply data reception period, wherein the power transmitting side data processing section distinguishes the reply data having a third power level from other power levels for reception.

A fourth aspect of the present invention is directed to a power transmitting/receiving communication method for performing power supply and intercommunications between a device on a power transmitting side and at least one device on a power receiving side, which are interconnected via two power transmission wires, comprising:

on the power transmitting side,
a power transmitting side power supplying step of outputting power having a first power level;
a power transmitting side data processing step of generating transmission data giving an instruction to the power receiving side device, and receiving and processing reply data from the power receiving side device;
a power transmitting side period controlling step of performing time-sharing control for a period of supplying the power, a data transmission period of transmitting the transmission data, and a reply data reception period of receiving the reply data; and
a power transmitting side synthesis step of supplying the power having the first power level, which is output from the power transmitting side power source section, to the power transmission wire during the power supply period, converting the transmission data into transmission data having a second power level for transmission to the power transmission wire during the data transmission period, and transmitting, to the power transmission wire, a data reception signal having a power level different from the first power level, during the reply data reception period, and on the power receiving side,
a power receiving side power storing step of storing the power having the first power level, which is supplied via the power transmission wire;
a power receiving side data processing step of receiving and processing the transmission data having the second power level from the power transmitting side device, and generating the reply data replying to the power transmitting side device;
a power receiving side transmitting step of converting the reply data output from the power receiving side data processing section into reply data having a third power level for replying to the power transmission wire, during the reply data reception period, and
a power level detecting step of detecting a power level of the power transmission wire and outputting power level detection results to the power receiving side data processing section, wherein
the power receiving side data processing step selects and receives data from the power transmission wire based on the power level detection results by the power level detecting step, and further outputs the reply data to the power receiving side transmitting step by detecting reception of the data reception signal.

The power receiving side data processing step is preferably characterized by selecting and receiving data having the second power level from the power transmission wire based on the power level detection results by the power level detecting step.

The power transmitting side data processing step is preferably characterized by further attaching an address of a receiving side as an address of a target to be instructed, and the power receiving side data processing step is characterized by processing only data having an address thereto, which is attached to the transmission data.

Also, the power receiving side data processing step is preferably characterized by further attaching an address thereof as a transmission source for making a reply.

The power transmitting side data processing step is preferably characterized by further attaching an identification code shared by an entire power receiving side, which is connected to the power transmission wire, as an address of a target to be instructed, and the entire power receiving side connected to the power transmission wire is characterized by processing the transmission data in accordance with the identification code attached to the transmission data.

DETAILED DESCRIPTION OF THE INVENTION

Figure 1:
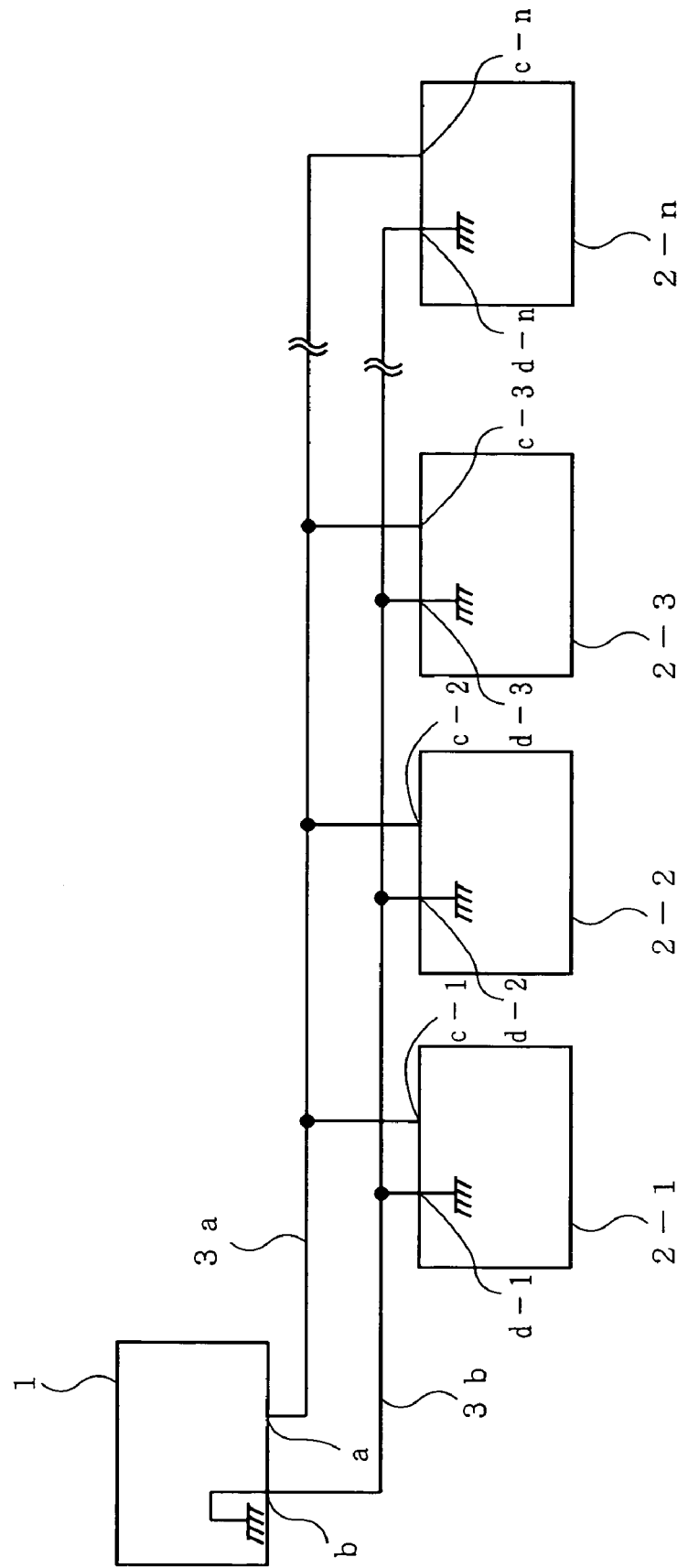
FIG. 1 is a block diagram illustrating the basic structure of a power transmitting/receiving communication apparatus according to an embodiment of the present invention.

FIG. 1 is a block diagram illustrating the basic structure of a power transmitting/receiving communication apparatus according to an embodiment of the present invention. Hereinafter, using FIG. 1, the embodiment will be described.

In FIG. 1, a power transmitting side device 1 and a plurality of power receiving side devices 2-1~n are interconnected by a pair of power transmission wires 3a and 3b. The power transmission wire 3a couples a terminal a of the power transmitting side device 1 to terminals c-1~n of the respective power receiving side devices 2-1~n, and the power transmission wire 3b couples a terminal b of the power transmitting side device 1 to terminals d-1~n of the respective power receiving side devices 2-1~n. By those power transmission wires 3a and 3b, power is supplied to the power receiving side devices 2-1~n from the power transmitting side device 1, and communication is performed between the power transmitting side device 1 and the power receiving side devices 2-1~n.

Figure 2:
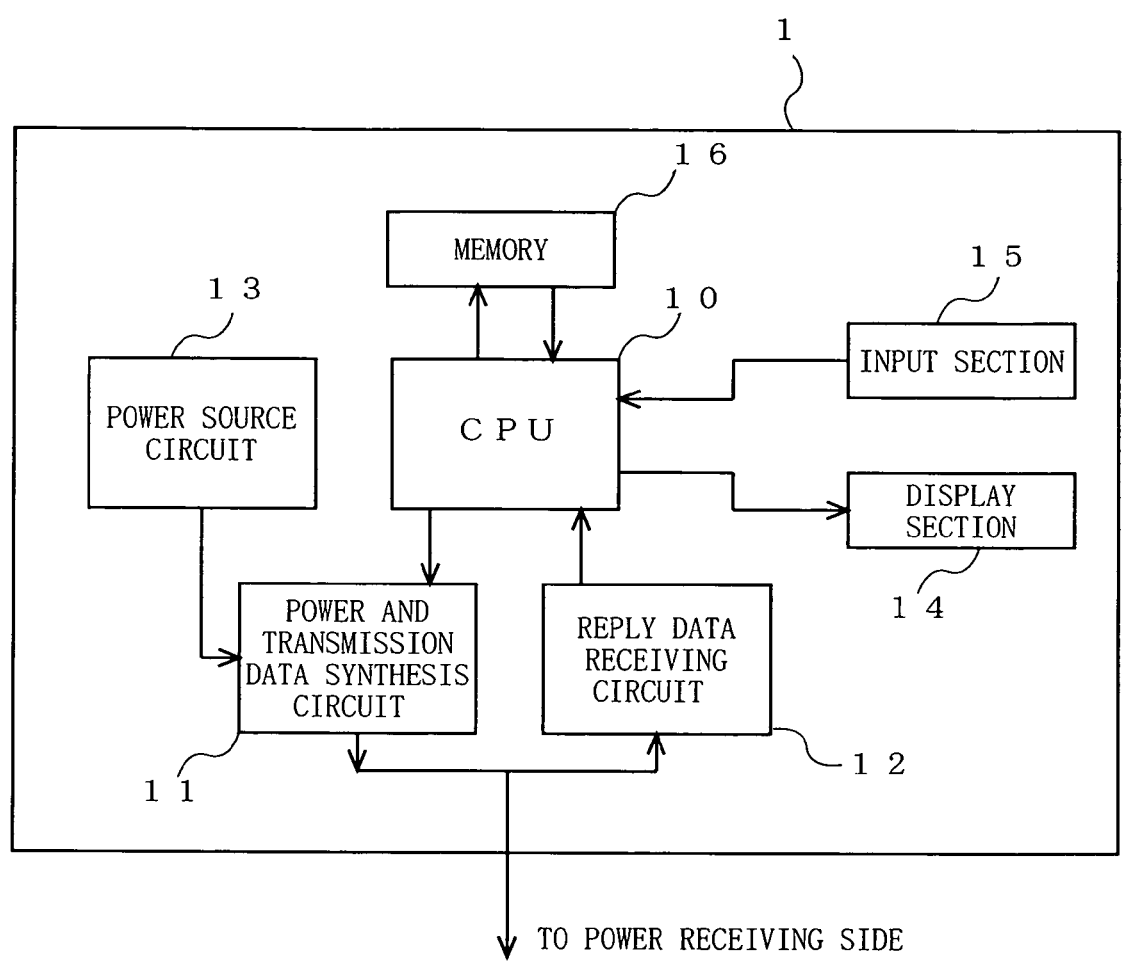
FIG. 2 is a block diagram illustrating the functional structure of a power transmitting side device in the power transmitting/receiving communication apparatus according to the embodiment of the present invention.

FIG. 2 is a block diagram illustrating the functional structure of the power transmitting side device 1 in the power transmitting/receiving communication apparatus. Note that FIG. 2 is an illustration showing only a functional block related to the present invention for simplification of descriptions. Hereinafter, using FIG. 2, the functional structure of the power transmitting side device 1 will be described.

In FIG. 2, the power transmitting side device 1 includes a CPU 10, a power and transmission data synthesis circuit 11, a reply data receiving circuit 12, a power source circuit 13, a display section 14, an input section 15, and a memory 16. The CPU 10 generates transmission data to the power receiving side device 2 and processes reply data from the power receiving side device 2. Also, the CPU 10 adjusts a processing timing in order to perform time-shared processing of power supply to the power receiving side device 2, transmission of the transmission data, and reception of the reply data. Furthermore, the CPU 10 outputs, to the display section 14, contents to be sent to a user, and performs a process based on contents input from the input section 15 in the case where there is an instruction from the user. Based on the timing adjusted by the CPU 10, the power and transmission data synthesis circuit 11 amplifies and transmits the transmission data to the power receiving side device 2 if transmission data from the CPU 10 to the power receiving side device 2 is output, and supplies power from the power source circuit 13 to the power receiving side device 2 if a power supply instruction is output. The reply data receiving circuit 12 extracts the reply data transmitted from the power receiving side device 2, and outputs it to the CPU 10. Note that, typically, a display device such as a liquid crystal display, etc., is used as the display section 14, and a device such as a keyboard or a numeric keypad, etc., is used as the input section 15.

Figure 3:
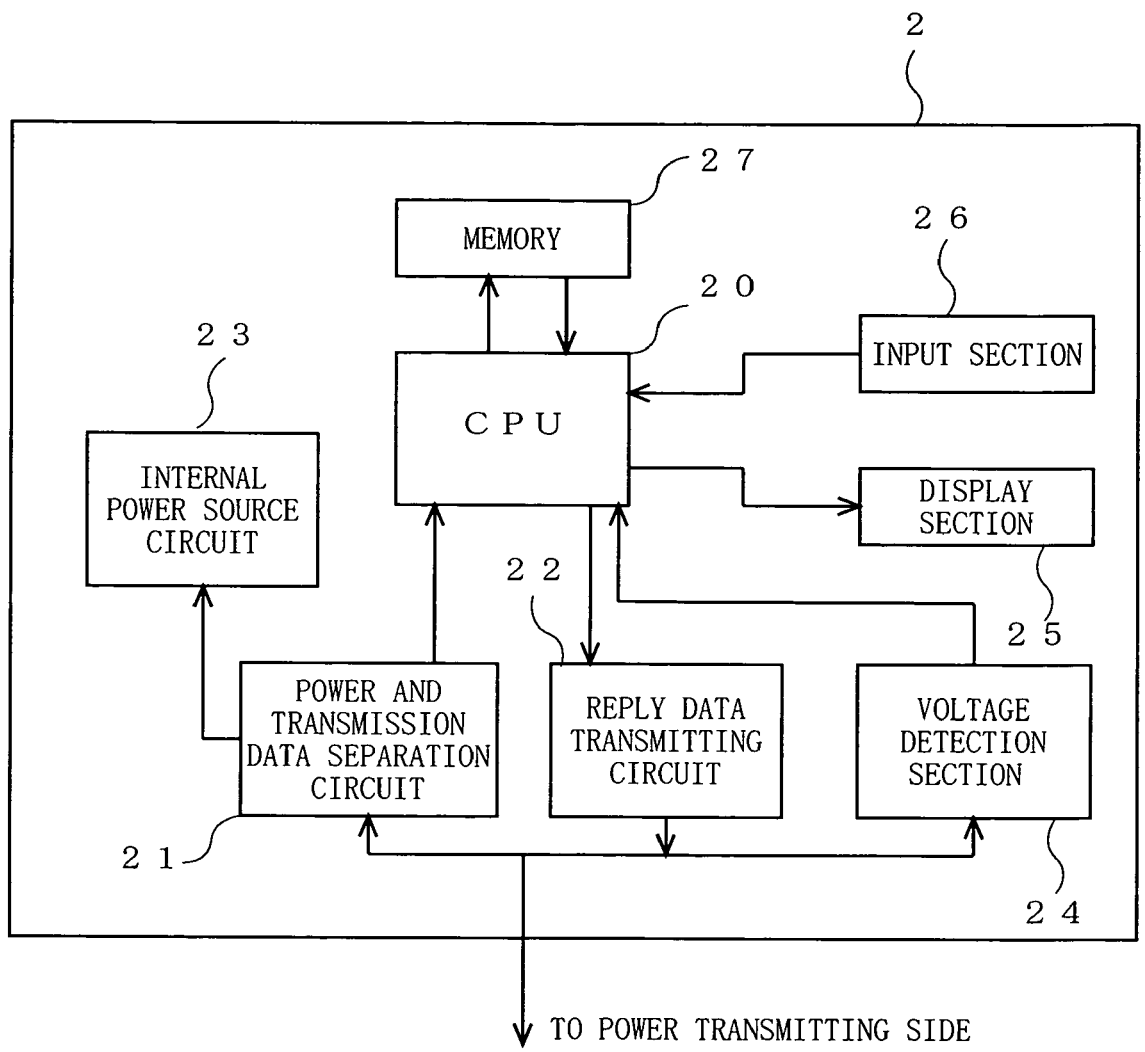
FIG. 3 is a block diagram illustrating the functional structure of a power receiving side device in the power transmitting/receiving communication apparatus according to the embodiment of the present invention.

FIG. 3 is a block diagram illustrating the functional structure of the power receiving side device 2 in the power transmitting/receiving communication apparatus. Note that FIG. 3 is an illustration showing only a functional block related to the present invention for simplification of descriptions. Hereinafter, using FIG. 3, the functional structure of the power receiving side device 2 will be described.

In FIG. 3, the power receiving side device 2 includes a CPU 20, a power and transmission data separation circuit 21, a reply data transmission circuit 22, an internal power source circuit 23, a voltage detection section 24, a display section 25, an input section 26, and a memory 27. The CPU 20 generates reply data to the power transmitting side device 1 and processes the transmission data from the power transmitting side device 1. Also, the CPU 20 outputs the data generated by the CPU 20 in accordance with a reply data transmission timing adjusted by the power transmitting side device 1. Furthermore, the CPU 20 outputs, to the display section 25, contents to be sent to the user, and performs a process based on contents input from the input section 26 in the case where there is an instruction or data from the user. The power and transmission data separation circuit 21 separates power and transmission data supplied from the power transmitting side device 1, and outputs the power and the transmission data to the internal power source circuit 23 and the CPU 20, respectively. The reply data transmission circuit 22 outputs, from the CPU 20 to the power transmitting side device 1, the reply data to be transmitted from the power receiving side device 2 to the power transmitting side device 1. The voltage detection section 24 detects a voltage input or output to/from the power receiving side device 2, determines a type of input or output data based on the voltage, and outputs the results to the CPU 20. Note that, typically, a display device such as a liquid crystal display or a number display, etc., is used as the display section 25, and a device such as a switch, a sensor, or a scanner, etc., is used as the input section 26.

Figure 4:
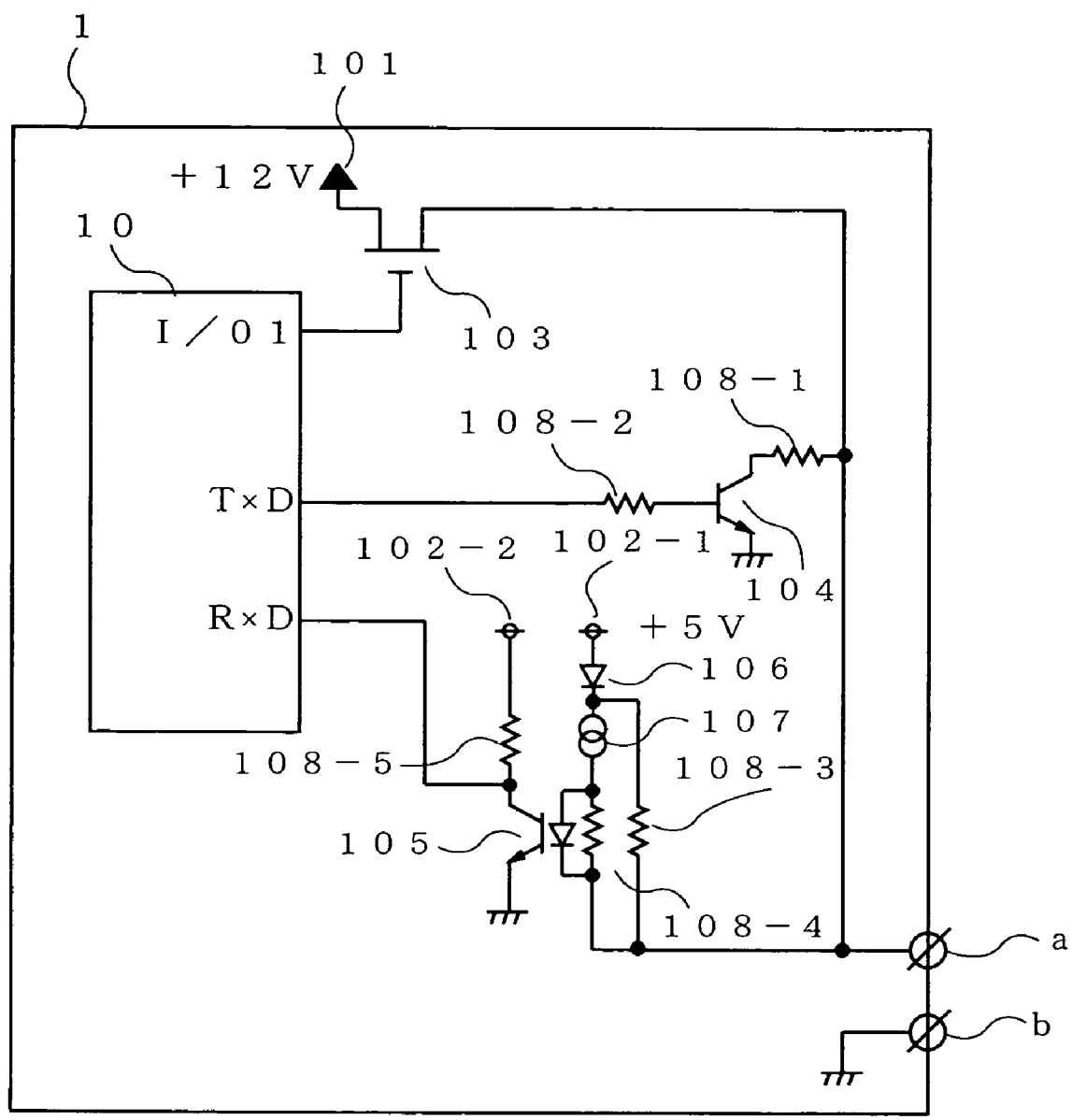
FIG. 4 is a circuit diagram of a circuit included in the power transmitting side device in the power transmitting/receiving communication apparatus according to the embodiment of the present invention.

Next, a circuit structure of the CPU 10, the power and transmission data synthesis circuit 11, the transmission data receiving circuit 12, and the power source circuit 13, which are included in the power transmitting side device 1, will be described. Note that FIG. 4 is a circuit diagram of a circuit structured between the CPU 10 of the power transmitting side device 1 and the power transmission wires 3. Hereinafter, using FIG. 4, a circuit of the power transmitting side device 1 is described.

In FIG. 4, a power transmitting side circuit is structured between the CPU 10 of the power transmitting side device 1 and the terminal a. In the power transmitting side circuit, a +12V power source 101, and +5V power sources 102-1 and 102-2, a field effect transistor 103 (hereinafter, referred to as FET), a transistor 104, a photocoupler 105, a diode 106, a constant current circuit 107, and resistors 108-1~5 are provided. Note that the terminal b is a GND line and is connected to ground in the power transmitting side device 1.

In the FET 103, a terminal I/O1 of the CPU 10, the power source 101, and the terminal a, are coupled to a gate, a source, and a drain, respectively. Also, in the transistor 104, via the resistor 108-2 and the resistor 108-1, respectively, a terminal TxD of the CPU 10 and the terminal a are coupled to a base and a collector, respectively, and an emitter is grounded. Furthermore, in the photocoupler 105, the power source 102-2 are coupled to a collector via a terminal RxD of the CPU 10 and the resistor 108-5, and an emitter is grounded. Also, in the photocoupler 105, the terminal a is coupled to the cathode side, and the power source 102-1 is coupled to the anode side via the constant current circuit 107 and the diode 106. Note that the resistor 108-4 is coupled in parallel to a diode section of the photocoupler 105, and the resistor 108-3 is coupled in parallel to the constant current circuit 107 and the resistor 108-4.

First, in the case where power is supplied from the power transmitting side device 1 to the power receiving side device 2, the CPU 10 outputs, from the terminal I/O1, a signal for turning the FET 103 ON. The FET 103 is turned ON by the signal, whereby +12V direct current of the power source 101 is applied to the terminal a, and supplied to the respective power receiving side devices 2 via the power transmission wire 3.

Next, in the case where transmission data is transmitted from the power transmitting side device 1 to the power receiving side device 2, the CPU 10 turns output from the terminal I/O1 OFF, whereby +12V direct current is turned OFF, and +5V direct current of the power source 102-1 is supplied to the terminal a. Then, the CPU 10 outputs pulse-like transmission data from the terminal TxD (the structure of the transmission data will be described below). The transistor 104 is turned ON/OFF due to a pulse-like voltage change of the transmission data, whereby the voltage of the terminal a is 0V when the transistor 104 is ON, and the voltage of the terminal a is +5V when the transistor 104 is OFF. That is, the voltage of the terminal a is changed in accordance with the transmission data, whereby the transmission data is output, as a pulse-like 0V⇔+5V output waveform, to the respective power receiving side devices 2 via the power transmission wire 3.

On the other hand, in the case where the power transmitting side device 1 receives the reply data from the power receiving side device 2, +5V direct current is supplied to the terminal a in the same manner as described above. After detecting the supply of the +5V direct current, the power receiving side device 2 changes its voltage into a +3.5V ⇔ +5V pulse as reply data (an operation of the power receiving side device 2 will be described below). When the voltage of the terminal a becomes +3.5V, the voltage on the cathode side of the photocoupler 105 becomes +3.5V, whereby current passes through the diode section of the photocoupler 105 due to occurrence of a potential difference between the anode side and the cathode side of the photocoupler 105. By this current, the transistor section of the photocoupler 105 enters an ON state, and the voltage of the terminal RxD of the CPU 10 becomes 0V. On the other hand, when the voltage of the terminal a is +5V, there is no potential difference between the anode side and the cathode side of the photocoupler 105, whereby no current passes through the diode section of the photocoupler 105. Thus, the transistor section of the photocoupler 105 enters an OFF state, and the voltage of the terminal RxD of the CPU 10 becomes +5V. By inputting the above-described voltage change of the terminal RxD, the CPU 10 receives the reply data from the power receiving side device 2.

Figure 5:
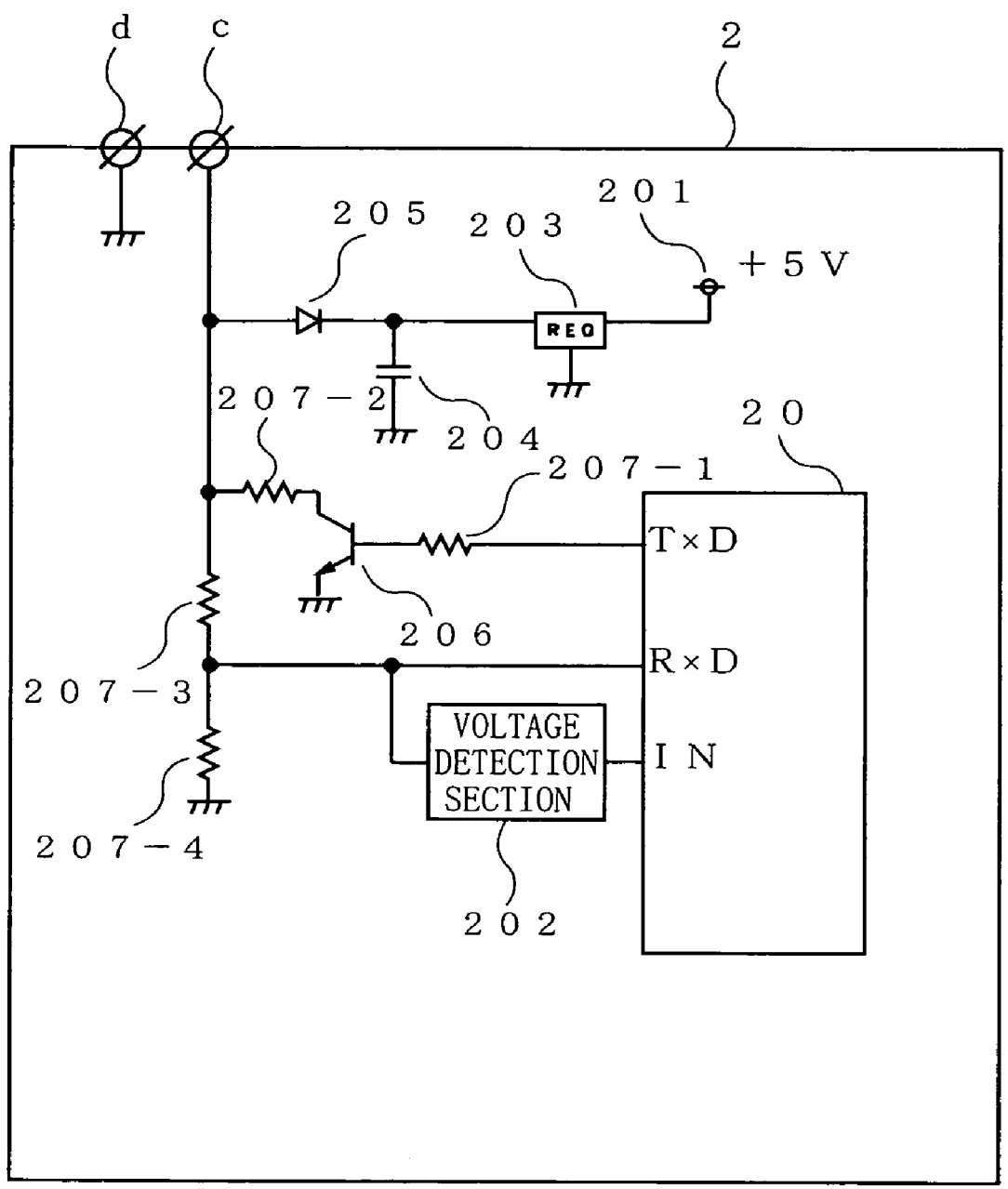
FIG. 5 is a circuit diagram of a circuit included in the power receiving side device in the power transmitting/receiving communication apparatus according to the embodiment of the present invention.

Next, a circuit structure of the CPU 20, the power and transmission data separation circuit 21, the reply data transmission circuit 22, the internal power source circuit 23, and the voltage detection section 24, which are included in the power receiving side device 2, will be described. Note that FIG. 5 is a circuit diagram of a circuit structured between the CPU 20 of the power receiving side device 2 and the power transmission wire 3. Hereinafter, using FIG. 5, a circuit of the power receiving side device 2 is described.

In FIG. 5, a power transmitting side circuit is structured between the CPU 20 of the power receiving side device 2 and the terminal c. In the power transmitting side circuit, a +5V internal power source 201, a voltage detection section 202, a regulator 203, a condenser 204, a diode 205, a transistor 206, and resistors 207-1~4 are provided. Note that the terminal d is a GND line, and connected to ground in the power receiving side device 2.

The regulator 203 has one end coupled to the power source 201 and the other end coupled to the condenser 204 and the diode 205. Also, the other end of the condenser 204 is grounded, and the other end of the diode 205 is coupled to the terminal c. Also, in the transistor 206, a terminal TxD of the CPU 20 is coupled to a base via the resistor 207-1 and the terminal c is coupled to a collector via the resistor 207-2, and an emitter is grounded. Furthermore, the resistor 207-3 has one end coupled to the terminal c and the other end coupled to the resistor 207-4, the voltage detection section 202, and the terminal RxD of the CPU 20. Also, the other end of the resistor 207-4 is grounded, and the voltage detection section 202 is coupled to a terminal IN of the CPU 20.

First, in the case where power is supplied from the power transmitting side device 1 to the power receiving side device 2, as described above, +12V direct current is supplied to the terminal c as power via the power transmission wire 3. The +12V direct current is stored in the condenser 204 after passing through the backflow-preventing diode 205. Also, the +12V direct current, which also passes through the regulator 203, is transformed into +5V direct current and supplied to the power source 201. The power source 201 is used as an operation power source of the power receiving side device 2; and the +12V stored in the condenser 204 is transformed into +5V by the regulator 203 and supplied as an operation power source in the case where +12V direct current, which will be described below, is not supplied.

Note that the +12V direct current supplied from the terminal c is divided by the resistors 207-3 and 207-4, and received by the voltage detection section 202. The voltage detection section 202 determines, based on a pre-set reference value, whether or not the above-described divided voltage is greater than the above-described reference value, and outputs the results to the terminal IN of the CPU 20. In the CPU 20, based on the results from the voltage detection section 202, the determination is made that the voltage of the terminal c is a supply voltage, whereby no data is received from the terminal RxD of the CPU 20.

Next, when the power receiving side device 2 receives transmission data from the power transmitting side device 1, as described above, the transmission data is input to the terminal c in the power receiving side device 2 as a 0V ⇔ +5V pulse-like voltage change, via the power transmission wire 3. The transmission data is divided by the resistors 207-3 and 207-4, and received by the voltage detection section 202. As described above, based on the pre-set reference value, the voltage detection section 202 determines whether or not the divided voltage is greater than the reference value, and outputs the results to the terminal IN of the CPU 20. In the CPU 20, based on the results from the voltage detection section 202, the determination is made that the transmission data from the power transmitting side device 1 is input to the terminal c, and the transmission data is received from the terminal RxD of the CPU 20. Note that the transmission data is a 0V⇔+5V pulse-like voltage change, and does not pass through the diode 205 due to the +12V stored in the condenser 204.

Next, when the reply data is transmitted from the power receiving side device 2 to the power transmitting side device 1, as described above, the +5V direct current is supplied to the terminal c via the power transmission wire 3. The +5V direct current is divided by the resistors 207-3 and 207-4, and received by the voltage detection section 202. As described above, based on the pre-set reference value, the voltage detection section 202 determines whether or not the above-described divided voltage is greater than the pre-set reference value, and outputs the results to the terminal IN of the CPU 20. In the CPU 20, based on the results from the voltage detection section 202, the determination is made that transmission of the reply data is instructed by the power transmitting side device 1, and the pulse-like reply data is output from the terminal TxD (the structure of the reply data will be described below). The transistor 206 is turned ON/OFF due to a pulse-like voltage change of the reply data, whereby the voltage of the terminal c becomes +3.5V when the transistor 206 is ON (a resistance value of the resistor 207-2 is previously adjusted, whereby the voltage of the terminal c in the ON state of the transistor 206 is adjusted so as to become +3.5V), and the voltage of the terminal c becomes +5V when the transistor 206 is OFF. That is, the voltage of the terminal c is changed in accordance with the above-described reply data, whereby the above-described reply data is output, as a pulse-like +3.5V⇔+5V output waveform, to the power transmitting side device 1 via the power transmission wire 3.

Figure 6:
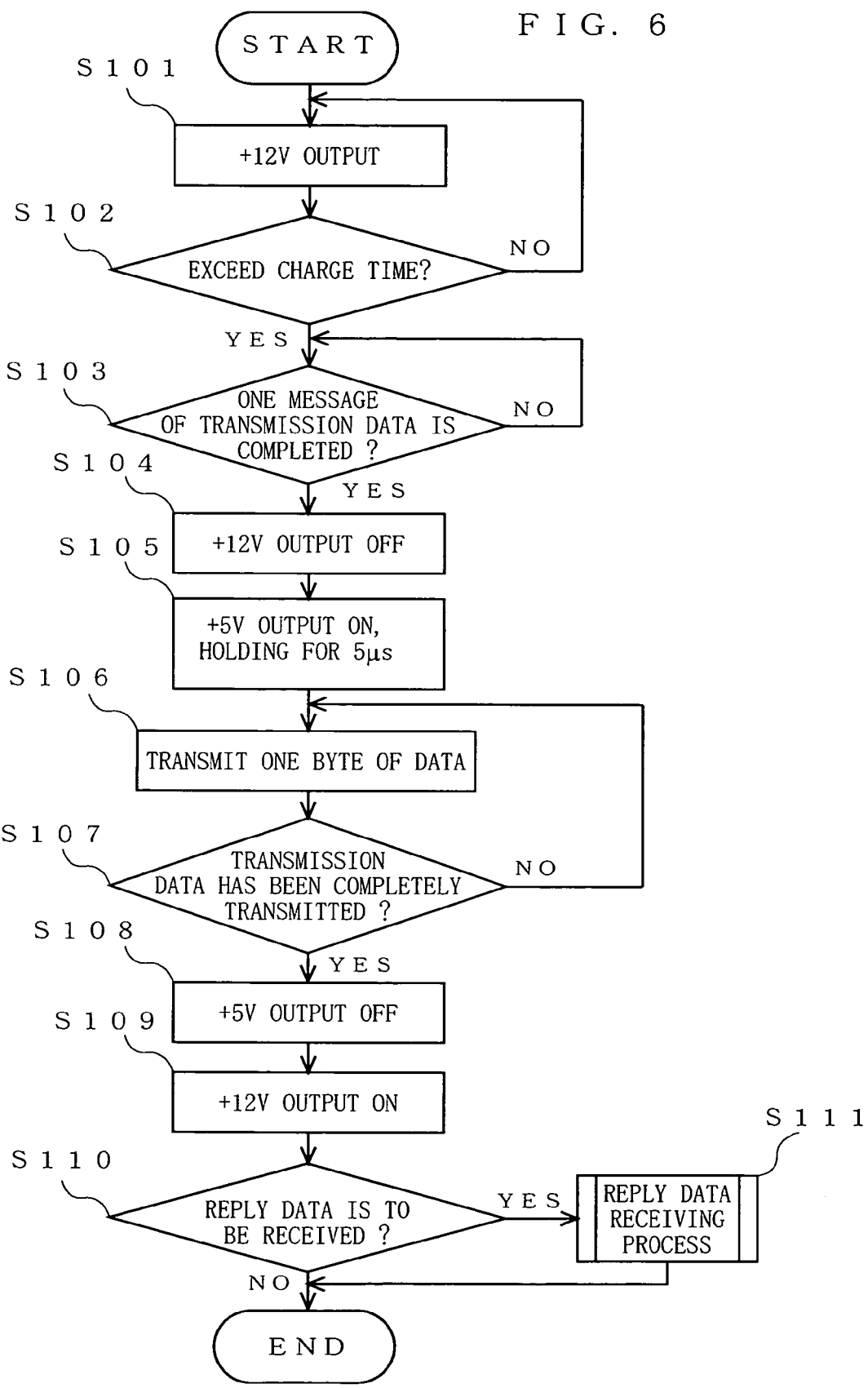
FIG. 6 is a flowchart showing an operation of the power transmitting side device in the power transmitting/receiving communication apparatus according to the embodiment of the present invention.
Figure 7:
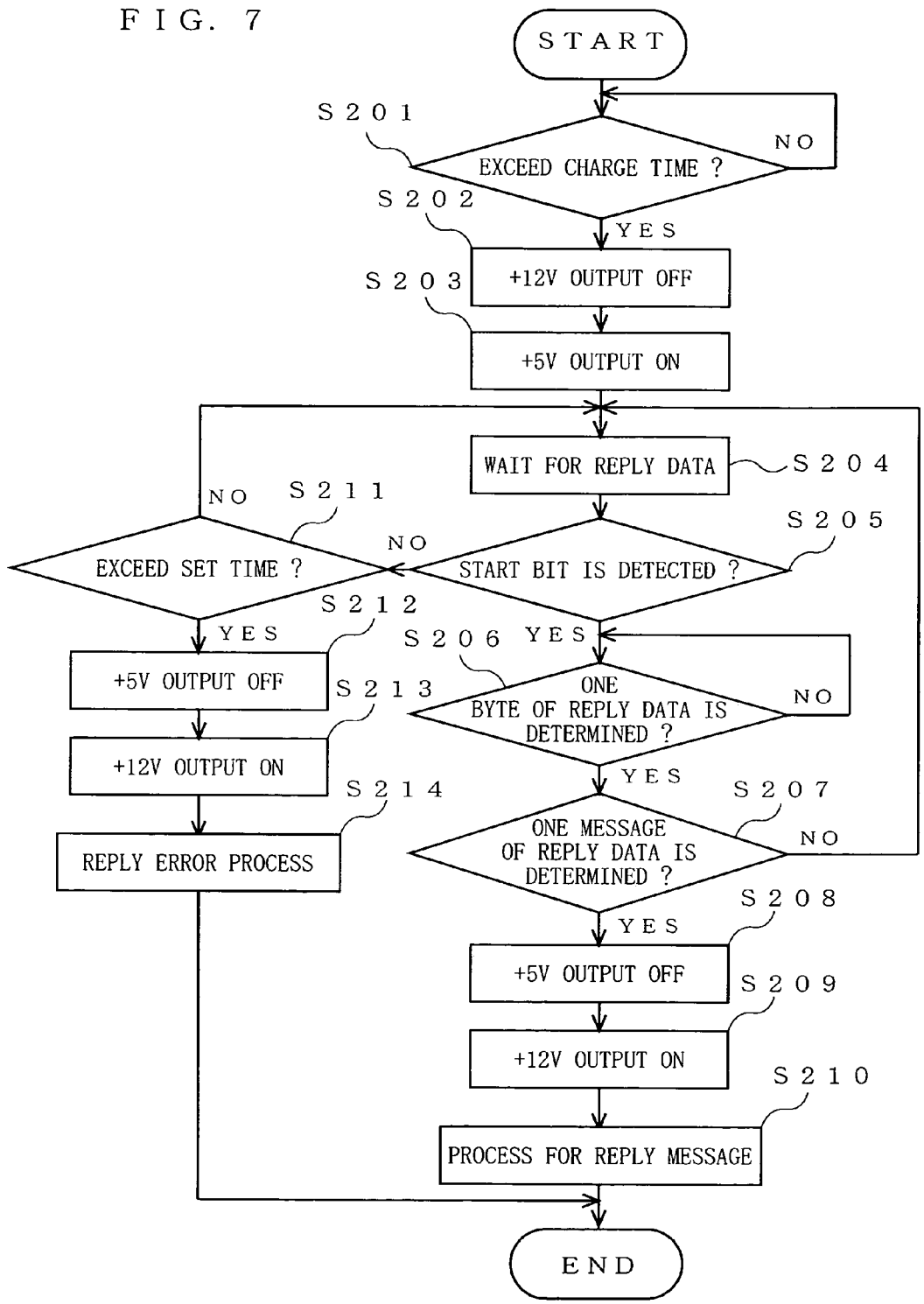
FIG. 7 is a flowchart showing a sub-routine of step S111 of FIG. 6.

Next, an operation of the power transmitting side device 1 will be described. Note that FIG. 6 is a flowchart showing the operation of the power transmitting side device 1, and FIG. 7 is a flowchart showing a sub-routine of step S111 of FIG. 6. Hereinafter, using FIGS. 6 and 7, the operation of the power transmitting side device 1 will be described.

In FIG. 6, the power transmitting side device 1 supplies, via the power transmission wire 3, +12V direct current as power of the power receiving side device 2 (step S101). This power supply is continued until the amount of power required for an operation of the respective power receiving side devices 2 coupled to the power transmission wire 3 is stored, whereby, in this case, a charge time is set in accordance with the power receiving side device 2 whose requiring amount of power is the greatest, and the power supply is continued until the charge time has elapsed (step S102). Next, the CPU 10 determines whether or not one message of transmission data to the power receiving side device 2 is completed (step S103). When one message of transmission data is completed, the CPU 10 turns the +12V power supply OFF (step S104), subsequently turns +5V direct current output ON, and holds the +5V during a time 5 μs (step S105). Next, the CPU 10 obtains one byte of data from the above-described one message of transmission data, and transmits it to the power transmission wire 3 (step S106).

This transmission data includes an integer multiple of one byte, and is capable of individually specifying the power receiving side device 2 corresponding to a transmission destination by an address. Furthermore, it is also possible to specify, as the transmission destination, an identification code shared by all the power receiving side devices 2 as the transmission destination. Also, data indicating a head of the one message (hereinafter, referred to as STX data) and data indicating an end of the one message (referred to as ETX data) are attached to the first byte of the transmission data and the last byte of the transmission data, respectively, and a start bit and a stop bit are attached to each byte of data.

Then, the CPU 10 determines whether or not the above-described one message of transmission data has been completely transmitted by detecting, for example, the ETX data (step S107). If some transmission data is remaining at step S107, the CPU 10 goes back to step S106, and transmits one byte of data from the remaining transmission data. On the other hand, if all the transmission data is transmitted at step S107, the CPU 10 turns output, which is turned ON at step S105, of +5V direct current OFF (step S108), and turns +12V direct current power supply ON (step S109). Next, the CPU 10 determines whether or not the transmission data at step S103 requests reply data from the destination power receiving side device 2 (step S110). If the determination is made at step S110 that the reply data is requested, the CPU 10 performs a process for receiving reply data from the power receiving side device 2 (step S111). If the determination is made at step S110 that the reply data is not requested, the CPU 10 continues the +12V power supply.

In FIG. 7, the above-described process for receiving reply data from the power receiving side device 2 at step S111 is described. First, the CPU 10 determines whether or not +12V power supply exceeds the above-described pre-set charge time required for power storage of the respective power receiving side devices 2 (step S201). Until a lapse of the above-described charge time, the CPU 10 continues the +12V power supply. If the above-described charge time has elapsed, the +12V power supply is turned OFF (step S202), and output of +5V direct current is turned ON (step S203). Next, the CPU 10 waits for reply data from the power receiving side device 2 (step S204), and determines whether or not a start bit, which is attached to the beginning of one byte of reply data, is detected (step S205). If the determination is made that the start bit is detected, the CPU 10 determines whether or not one byte of reply data has been completely received (step S206), and continues receiving until one byte of reply data is finalized. If the determination is made at step S206 that one byte of reply data is received, the CPU 10 determines whether or not the received reply data has completely received one message, based on the above-described ETX data, for example (step S207). If the determination is made at step S207 that the received reply data is incomplete, the CPU 10 goes back to step S204, and continues waiting for the reply data. Next, if the determination is made at step S207 that the received reply data has completely received one message, the CPU 10 turns output of +5V direct current OFF (step S208), and turns +12V power supply ON (step S209). Then, the CPU 10 performs a process for the reply data (step S210), and ends the reply data receiving process.

On the other hand, if the start bit is not detected at step S205, the CPU 10 determines whether or not an elapsed time from step S203 is longer than the pre-set time (step S211). If the above-described elapsed time is shorter than the pre-set time, the CPU 10 goes back to step S204, and continues waiting for data. If the above-described elapsed time is longer than the pre-set time, the CPU 10 determines that it is a reply error of the power receiving side device 2, turns output of +5V direct current OFF (step S212), turns +12V power supply ON (step S 213), and performs a reply error process such as a request to retransmit reply data according to a type of data requesting a reply (step S214).

Figure 8:
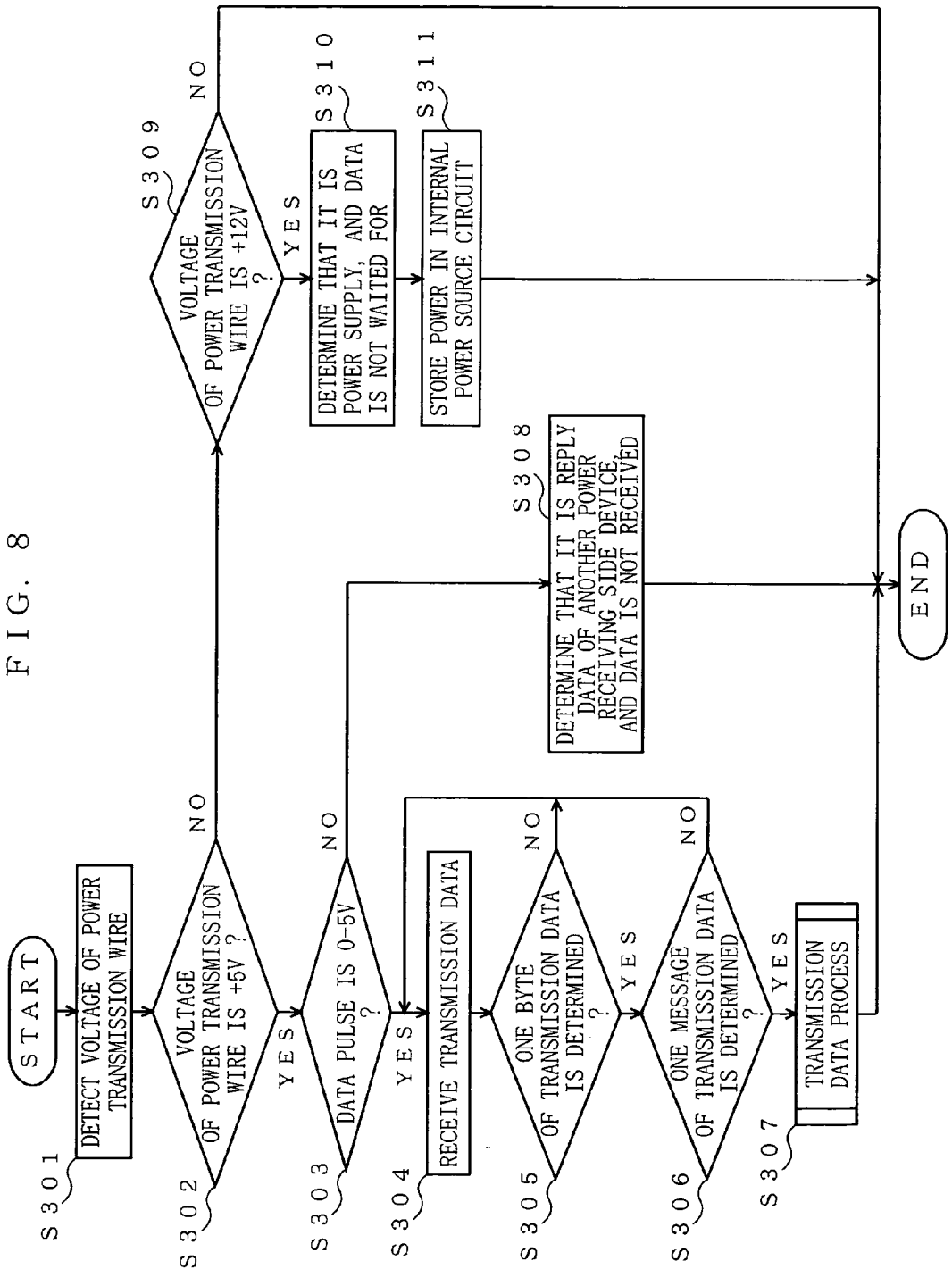
FIG. 8 is a flowchart showing an operation of the power receiving side device in the power transmitting/receiving communication apparatus according to the embodiment of the present invention.
Figure 9:
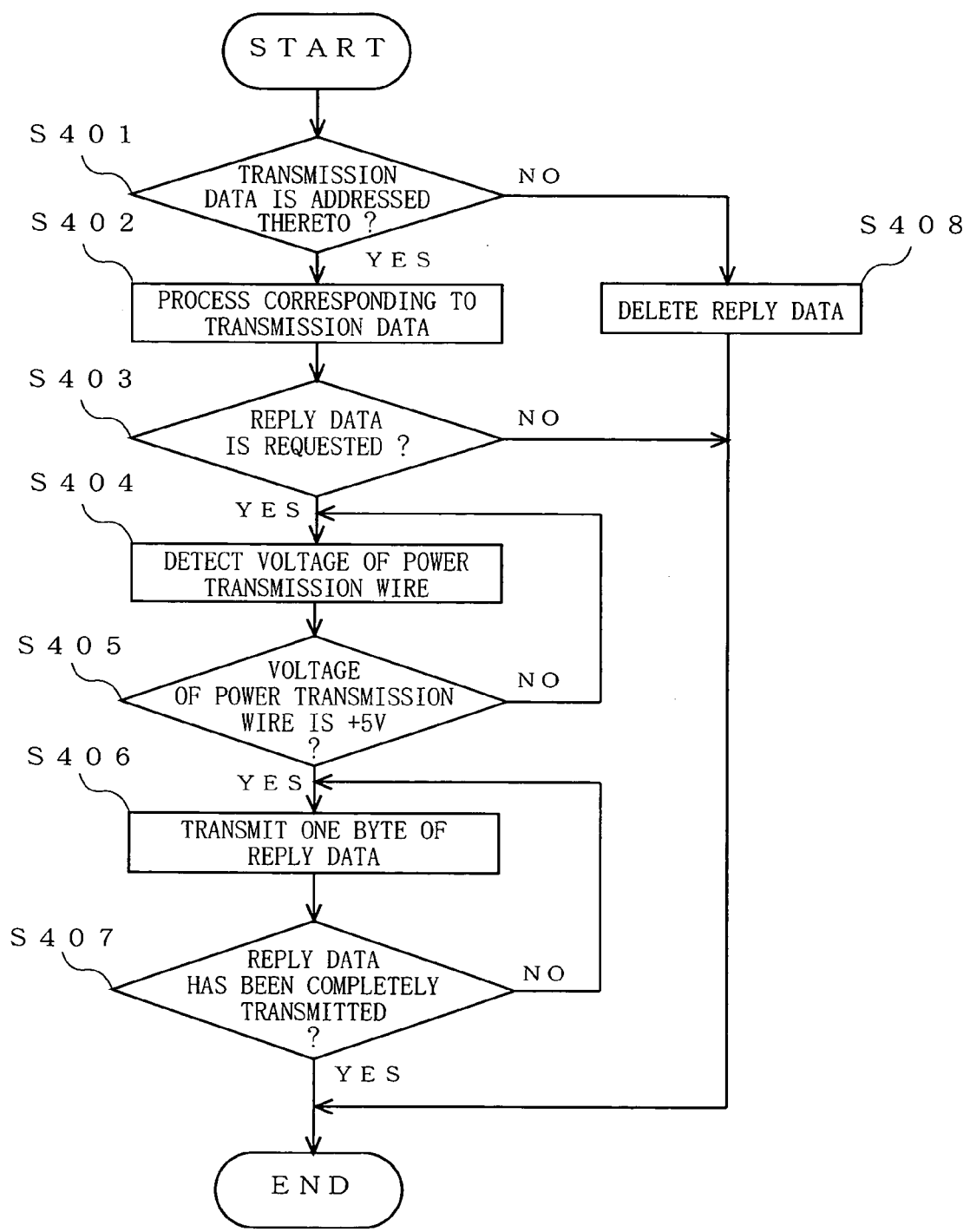
FIG. 9 is a flowchart showing a sub-routine of step S307 of FIG. 8.

Next, an operation of the power receiving side device 2 will be described. Note that FIG. 8 is a flowchart showing the operation of the power receiving side device 2, and FIG. 9 is a flowchart showing a sub-routine of step S307 of FIG. 8. Hereinafter, using FIGS. 8 and 9, the operation of the power receiving side device 2 is described.

In FIG. 8, the power receiving side device 2 detects, in the voltage detection section 202, a voltage of the power transmission wire 3 (step S301). In the voltage detection section 202, the determination is made, in a pre-set voltage range, whether or not the voltage of the power transmission wire 3 is +5V (step S302), and whether or not it is +12V (step S309), and an output corresponding to the respective cases is output to the CPU 20.

If the determination is made at step S302 that the voltage of the power transmission wire 3 is +5V, the CPU 20 determines that data is to be transmitted from the power transmitting side device 1 or another power receiving side device 2. Furthermore, the voltage detection section 202 detects a voltage range of the received pulse-like data, detects whether or not a voltage range of the data is 0V⇔+5V based on a pre-set voltage range in similar manners as described above (step S303), and outputs the results to the CPU 20. If the voltage range of the received data is 0V⇔+5V, the CPU 20 determines that it is transmission data from the power transmitting side device 1, and receives the transmission data from the terminal RxD (step S304). Next, the CPU 20 determines whether or not one byte of transmission data is received (step S305). If the determination is made at step S305 that one byte of transmission data is received, the CPU 20 determines whether or not one message of the received transmission data has been completely received, based on the ETX data, for example (step S306). If the determination is made at steps S305 and S306 that the received transmission data is incomplete, the CPU 20 goes back to step S304, and continues receiving the transmission data. Next, if the determination is made at step S306 that one message of the received transmission data has been completely received, the CPU 20 performs a process for the received transmission data (step S307).

On the other hand, if the data is not 0V⇔+5V at step S303 (for example, pulse-like +3.5⇔+5V data), the CPU 20 determines that it is reply data, etc., from another power receiving side device 2 to the power transmitting side device 1, and does not receive data from the power transmission wire 3 (step S308).

Also, if the determination is made at step S309 that the voltage of the power transmission wire 3 is +12V, and hence that it is power supply from the power transmitting side device 1, the CPU 20 does not perform reception from the power transmission wire 3 to the CPU 20 (step S310), and stores power in the internal power source circuit 23 of the power receiving side device 2 (step S311). Note that if the determination is made at step S309 that the voltage of the power transmission wire 3 is not +12V, the voltage detection section 202 continues detecting of the voltage of the power transmission wire 3.

In FIG. 9, the process for receiving transmission data from the power transmitting side device 1 as aforementioned at step S307 is described. First, the CPU 20 determines whether or not the transmission data is addressed thereto based on an address, etc., indicating a destination of the transmission data (step S401). If the transmission data is not addressed thereto, the CPU 20 deletes the transmission data (step S408), and ends the process. If the transmission data is addressed thereto, the CPU 20 performs a process corresponding to the transmission data (step S402). Then, the CPU 20 determines whether or not the transmission data requests reply data to the power transmitting side device 1 (step S403). If the transmission data does not request reply data, the CPU 20 ends the transmission data receiving process.

On the other hand, if the transmission data requests reply data at step S403, the voltage detection section 202 detects the voltage of the power transmission wire 3 in order to detect a timing of transmitting the reply data from the power receiving side device 2 (step S404). The voltage detection section 202 determines the voltage of the power transmission wire 3 based on a pre-set voltage range, and outputs, to the CPU 20, an output corresponding to each case. The CPU 20 determines whether or not the voltage of the power transmission wire 3 is +5V based on a signal from the voltage detection section 202 (step S405), and continues detecting the voltage until the voltage of the power transmission wire 3 becomes +5V. If the determination is made at step S405 that the voltage of the power transmission wire 3 has become +5V, the CPU 20 transmits one byte of reply data to the power transmitting side device 1 (step S406).

As is the case with the above-described transmission data, this reply data also includes an integer multiple of one byte, and is capable of attaching an individual address of the power receiving side device 2 corresponding to a transmission source. Also, an STX data and an ETX data are attached to the first one byte of the reply data and the last one byte of the reply data, respectively, and a start bit and a stop bit are attached to each one byte of data.

Next, the CPU 20 determines whether or not all the reply data has been transmitted (step S407). If the reply data is remaining, the CPU 20 goes back to step S406, and continues transmitting the reply data. If all the reply data is transmitted, the CPU 20 ends the process.

Note that, in the flowchart of FIG. 9, the power receiving side device 2 transmits the reply data at step S406 after the process corresponding to the reply data of step S402. However, in accordance with the contents of a process performed by the CPU 20, steps S402 and S406 may be performed simultaneously, or a process at step S402 may be continuously performed.

Figure 10A:
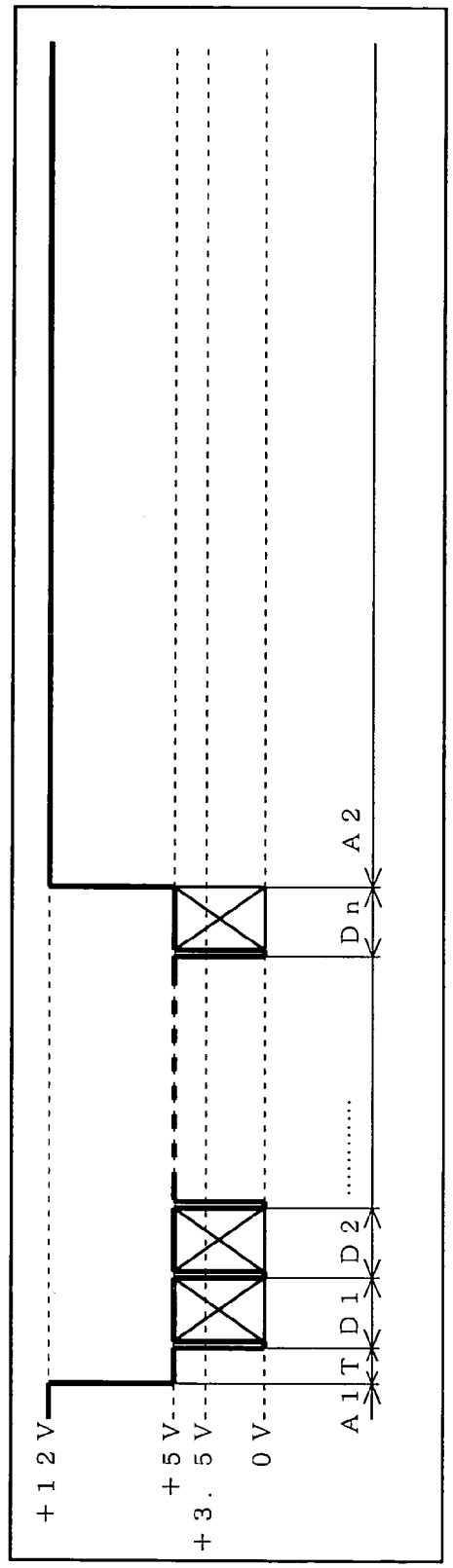
FIG. 10 is an illustration showing power transmission and communication data, which is performed between the power transmitting side device and the power receiving side device in the power transmitting/receiving communication apparatus according to the embodiment of the present invention, by a relationship between a voltage change and time.
Figure 10B:
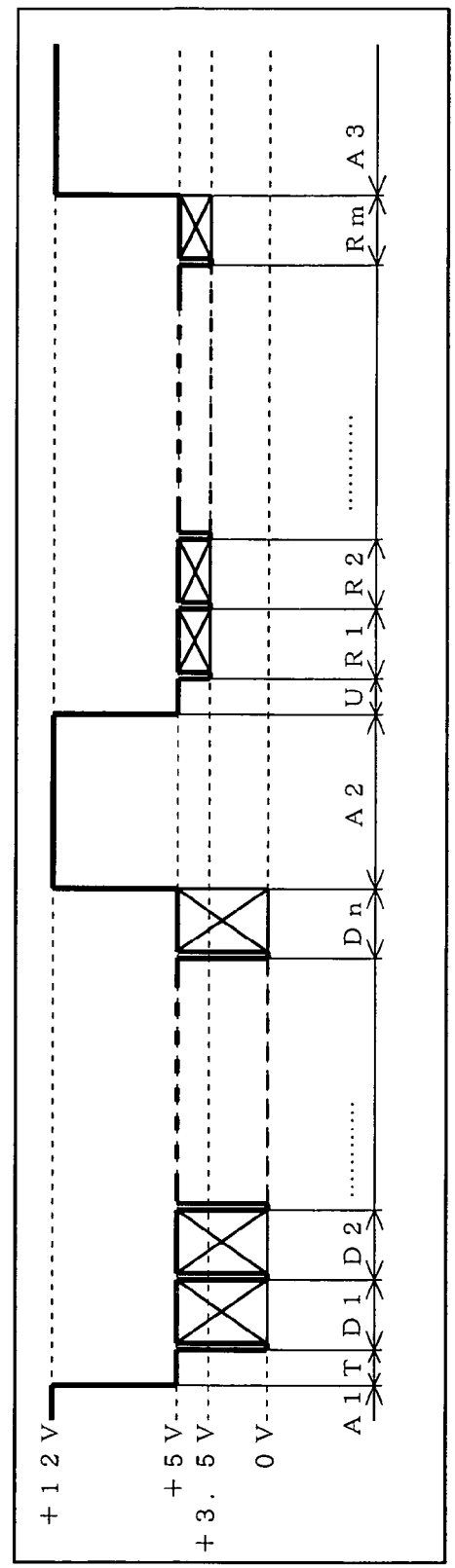

Next, power supply and communication data performed between the power transmitting side device 1 and the power receiving side device 2 will be described. Note that FIG. 10 is an illustration showing power transmission and communication data, which is performed between the power transmitting side device 1 and the power receiving side device 2, by a relationship between a voltage change and time. FIG. 10(a) shows a case in which the power transmitting side device 1 does not request reply data from the power receiving side device 2, and FIG. 10(b) shows a case in which the power transmitting side device 1 requests reply data from the power receiving side device 2. Hereinafter, using FIG. 10, a relationship between a voltage change and time will be described.

FIG. 10(a) is an illustration showing a power which is supplied and data which is transmitted/received, between the power transmitting side device 1 and the power receiving side device 2 via the power transmission wire 3, in which a horizontal axis indicates time and a vertical axis indicates a voltage, in a case where the power transmitting side device 1 does not request reply data from the power receiving side device 2. In FIG. 10(a), during an interval A1, +12V direct current is first supplied to the power transmission wire 3 from the power transmitting side device 1. Here, the interval A1 is continued longer than the charge time corresponding to the power receiving side device 2 whose requiring amount of power storage is the greatest. Then, the power transmitting side device 1 supplies +5V direct current to the power transmission wire 3 for 5 μs during an interval T in order to notify the respective power receiving side devices 2 of transmission of the transmission data. Then, the power transmitting side device 1 transmits n bytes of transmission data during corresponding intervals D1~n. The voltages of the respective data D1~n are changed from 0V⇔+5V like a pulse, and a head bit of each data D1~n indicates a start bit. Also, data D1, which is a first byte of the transmission data, is the STX data indicating a head of one message of data, as aforementioned, and data Dn is the ETX data indicating an end of one message of data. After the completion of transmission of the transmission data, the power transmitting side device 1 supplies +12V direct current to the respective power receiving side devices 2 during an interval A2.

FIG. 10(b) is an illustration showing a power which is supplied and data which is transmitted/received, between the power transmitting side device 1 and the power receiving side device 2 via the power transmission wire 3, in which a horizontal axis indicates time and a vertical axis indicates a voltage, in a case where the power transmitting side device 1 requests reply data from the power receiving side device 2. In FIG. 10(b), the intervals A1~Dn are the same as above-described FIG. 10(a), with the descriptions thereof omitted. As described above, during the interval A2, the power transmitting side device 1 continues +12V power supply longer than the charge time corresponding to the power receiving side device 2 whose requiring amount of power storage is the greatest. Then, during an interval U, the power transmitting side device 1 supplies +5V direct current to the power transmission wire 3 in order to urge the power receiving side device 2 to transmit the reply data. The power receiving side device 2 transmitting the reply data detects +5V, and transmits m bytes of data R1~Rm. The respective data R1~m have a pulse-like +3.5V⇔+5V voltage change, and a head bit of each data R1~m indicates a start bit. Also, data R1, which is a first byte of the reply data, is the STX data indicating a head of one message of data, as aforementioned, and data Rm is the ETX data indicating an end of one message of data. After the completion of reception of the reply data, the power transmitting side device 1 supplies +12V direct current to the respective power receiving side devices 2 during an interval A3.

Note that, in the present embodiment, it is assumed that a supply voltage to the respective power receiving side devices 2 is +12V, a voltage of the transmission data transmitted from the power transmitting side device 1 is 0V⇔+5V, and a voltage of the reply data transmitted from the power receiving side device 2 is +3.5V⇔+5V, but those voltages are not limited thereto. As long as the above-described power supply, the above-described transmission data, and the above-described reply data can be distinguished by detecting a voltage, any voltage can realize the present power transmitting/receiving communication apparatus.

As such, in the power transmitting/receiving communication apparatus according to the present invention, it is possible to perform time-shared transmission/reception of a power supply to the power receiving side device, and communication data between the power transmitting side device and the power receiving side device, and it is also possible to perform bi-directional communications capable of specifying the power receiving side device processing transmission data, or identifying the power receiving side device replying the reply data, by assigning data to be transmitted/received with an address of the power receiving side device. Furthermore, by setting different voltages for the transmission data from the power transmitting side device and the reply data from the power receiving side device, the power receiving side device can identify the reply data from another power receiving side device by only detecting a voltage, thereby selecting unnecessary data by a hardware-related process and reducing a processing burden of the CPU. As a result, a software process of the power receiving side device is simplified, and a cost of software can be reduced. As a result, a software process of the power receiving side device is simplified, and a cost of software can be reduced.

INDUSTRIAL APPLICABILITY

As described above, the present invention, which is low in cost and transmission-efficient, allows a processing burden of the receiving side to be reduced in a power transmitting/receiving communication apparatus and method, more particularly, in a two-wire power transmitting/receiving communication apparatus and method using two power transmission wires for performing power transmission/reception and intercommunications.

The invention claimed is:

1. A power transmitting/receiving communication apparatus in which power supply and intercommunications are performed between a power transmitting side device and at least one power receiving side device, which are interconnected via two power transmission wires, wherein
the power transmitting side device includes:
a power transmitting side power source section operable to output power having a first power level;
a power transmitting side data processing section operable to generate transmission data giving an instruction to the power receiving side device, and to receive and process reply data from the power receiving side device;
a power transmitting side period control section operable to perform time-sharing control for a period of supplying the power, a data transmission period of transmitting the transmission data, and a reply data reception period of receiving the reply data; and
a power transmitting side synthesis section operable to supply the power having the first power level, which is output from the power transmitting side power source section, to the power transmission wire during the power supply period, to convert the transmission data into transmission data having a second power level for transmission to the power transmission wire during the data transmission period, and further operable to transmit, to the power transmission wire, a data reception signal having a power level different from the first power level during the reply data reception period, and
the power receiving side device includes:
a power receiving side power source section operable to store the power having the first power level, which is supplied via the power transmission wire;
a power receiving side data processing section operable to receive and process the transmission data having the second power level from the power transmitting side device, and to generate the reply data making a reply to the power transmitting side device;
a power receiving side transmitting section operable to convert the reply data output from the power receiving side data processing section into reply data having a third power level for replying to the power transmission wire, during the reply data reception period; and
a power level detection section operable to detect a power level of the power transmission wire, and to output power level detection results to the power receiving side data processing section, and
the power receiving side data processing section is operable to select and receive data from the power transmission wire based on the power level detection results from the power level detection section, and to output the reply data to the power receiving side transmitting section by detecting reception of the data reception signal.

2. The power transmitting/receiving communication apparatus according to claim 1, wherein the power receiving side data processing section is operable to select and receive data having the second power level from the power transmission wire based on the power level detection results from the power level detection section.

3. The power transmitting/receiving communication apparatus according to claim 1, wherein
the power transmitting side data processing section is further operable to attach an address of the power receiving side device to the transmission data, as an address of a target to be instructed, and the power receiving side data processing section is operable to process only data having an address, which is attached to the transmission data, addressed thereto.

4. The power transmitting/receiving communication apparatus according to claim 1, wherein the power receiving side data processing section is further operable to attach an address thereof as a transmission source for making a reply.

5. The power transmitting/receiving communication apparatus according to claim 1 wherein the power transmitting side data processing section is further operable to attach an identification code shared by all the power receiving side devices, which are connected to the power transmission wire, as an address of a target to be instructed, and all the power receiving side data processing sections connected to the power transmission wire are operable to process the transmission data in accordance with the identification code attached to the transmission data.

6. A power receiving communication device, which is supplied with power from a power transmitting side device connected via two power transmission wires, for performing intercommunications with the power transmitting side device, the power receiving communication device comprising:

a power receiving side power source section operable to store power having a first power level, which is supplied from the power transmitting side device via the power transmission wire;

a power receiving side data processing section operable to receive and process transmission data having a second power level from the power transmitting side device, and to generate the reply data making a reply to the power transmitting side device;

a power receiving side transmitting section operable to convert the reply data output from the power receiving side data processing section into reply data having a third power level for replying to the power transmission wire, during a reply data reception period, in which the power transmitting side device is operable to perform time-sharing and transmit a data reception signal having a power level different from the first power level; and a power level detection section operable to detect a power level of the power transmission wire and to output power level detection results to the power receiving side data processing section, wherein the power receiving side data processing section is operable to select and receive data from the power transmission wire based on the power level detection results from the power level detection section, and to output the reply data to the power receiving side transmitting section by detecting reception of the data reception signal.

7. The power receiving communication device according to claim 6, wherein the power receiving side data processing section is operable to select and receive data having the second power level from the power transmission wire based on the power level detection results from the power level detection section.

8. A power transmitting communication device for performing power supply and intercommunications with at least one power receiving side device connected via two power transmission wires, the power transmitting communication device comprising:

a power transmitting side power source section operable to output power having a first power level to the power receiving side device;

a power transmitting side data processing section operable to generate transmission data giving an instruction to the power receiving side device, and to receive and process reply data from the power receiving side device;

a power transmitting side period control section operable to perform time-sharing control for a period of supplying the power, a data transmission period of transmitting the transmission data, and a reply data reception period of receiving the reply data; and a transmitting side synthesis section operable to supply the power having the first power level, which is output from the power transmitting side power source section, to the power transmission wire during the power supply period, to convert the transmission data into transmission data having a second power level for transmission to the power transmission wire during the data transmission period, and to transmit to the power receiving side device, a data reception signal having a power level different from the first power level via the power transmission wire during the reply data reception period, wherein the power transmitting side data processing section is operable to distinguish the reply data having a third power level from other power levels for reception.

9. A power transmitting/receiving communication method for performing power supply and intercommunications between a device on a power transmitting side and at least one device on a power receiving side, which are interconnected via two power transmission wires, the power transmitting/receiving communication method comprising:

on the power transmitting side, a power transmitting side power supplying step of outputting power having a first power level;

a power transmitting side data processing step of generating transmission data giving an instruction to the power receiving side device, and receiving and processing reply data from the power receiving side device;

a power transmitting side period controlling step of performing time-sharing control for a period of supplying the power, a data transmission period of transmitting the transmission data, and a reply data reception period of receiving the reply data, and a power transmitting side synthesis step of supplying the power having the first power level, which is output from the power transmitting side power source section, to the power transmission wire during the power supply period, converting the transmission data into transmission data having a second power level for transmission to the power transmission wire during the data transmission period, and transmitting, to the power transmission wire, a data reception signal having a power level different from the first power level during the reply data reception period, and on the power receiving side, a power receiving side power storing step of storing the power having the first power level, which is supplied via the power transmission wire;

a power receiving side data processing step of receiving and processing the transmission data having the second power level from the power transmitting side device, and generating the reply data making a reply to the power transmitting side device;

a power receiving side transmitting step of converting the reply data output from the power receiving side data processing section into reply data having a third power level for replying to the power transmission wire during the reply data reception period, and a power level detecting step of detecting a power level of the power transmission wire and outputting power level detection results to the power receiving side data processing section, wherein the power receiving side data processing step selects and receives data from the power transmission wire based on the power level detection results by the power level detecting step, and further outputs the reply data to the power receiving side transmitting step by detecting reception of the data reception signal.

10. The power transmitting/receiving communication method according to claim 9, wherein the power receiving side data processing step selects and receives data having the second power level from the power transmission wire based on the power level detection results by the power level detecting step.

11. The power transmitting/receiving communication method according to claim 9, wherein the power transmitting side data processing step further attaches an address of a receiving side as an address of a target to be instructed, and the power receiving side data processing step processes only data having an address thereto, which is attached to the transmission data.

12. The power transmitting/receiving communication method according to claim 9, wherein the power receiving side data processing step further attaches an address thereof as a transmission source for making a reply.

13. The power transmitting/receiving communication method according to claim 9, wherein the power transmitting side data processing step further attaches an identification code shared by an entire power receiving side, which is connected to the power transmission wire, as an address of a target to be instructed, and the entire power receiving side connected to the power transmission wire processes the transmission data in accordance with the identification code attached to the transmission data.

* * * * *